United States Patent [19]

Nara

[11] Patent Number: 5,105,074
[45] Date of Patent: Apr. 14, 1992

[54] POWER SUPPLY RELIABILITY OF PORTABLE ELECTRONIC DEVICE

[75] Inventor: Seietsu Nara, Yokohama, Japan

[73] Assignee: Kabushiki Kaisha Toshiba, Kawasaki, Japan

[21] Appl. No.: 534,483

[22] Filed: Jun. 6, 1990

[30] Foreign Application Priority Data

Jun. 6, 1989 [JP] Japan .................................. 1-143828

[51] Int. Cl.$^5$ .................... G06K 19/073; G06F 15/20
[52] U.S. Cl. ................................. 235/492; 235/437; 235/380
[58] Field of Search ................ 235/375, 380, 441, 436, 235/437, 487, 492; 371/12, 66; 307/64-66

[56] References Cited

U.S. PATENT DOCUMENTS

| | | | |
|---|---|---|---|
| 4,766,294 | 8/1988 | Nara et al. | 235/492 |
| 4,814,591 | 3/1989 | Nara et al. | 235/380 |
| 4,843,224 | 6/1989 | Ohta et al. | 235/487 |
| 4,968,899 | 11/1990 | Katsutani et al. | 307/65 |

*Primary Examiner*—Robert Weinhardt
*Attorney, Agent, or Firm*—Cushman, Darby & Cushman

[57] ABSTRACT

A portable electronic device comprising a clock generator for generating a clock signal, a power supply for generating a first power supply voltage, a low-voltage generator for generating a second power supply voltage lower than the first power supply voltage in response to the clock signal, an instruction circuit for instructing start of the clock generator, and a supply circuit for, when a start instruction of the clock generator is generated by the instruction circuit, supplying the first power supply voltage to the clock generator, and after the clock generator is started by the first power supply voltage, supplying the second power supply voltage to the clock generator.

8 Claims, 6 Drawing Sheets

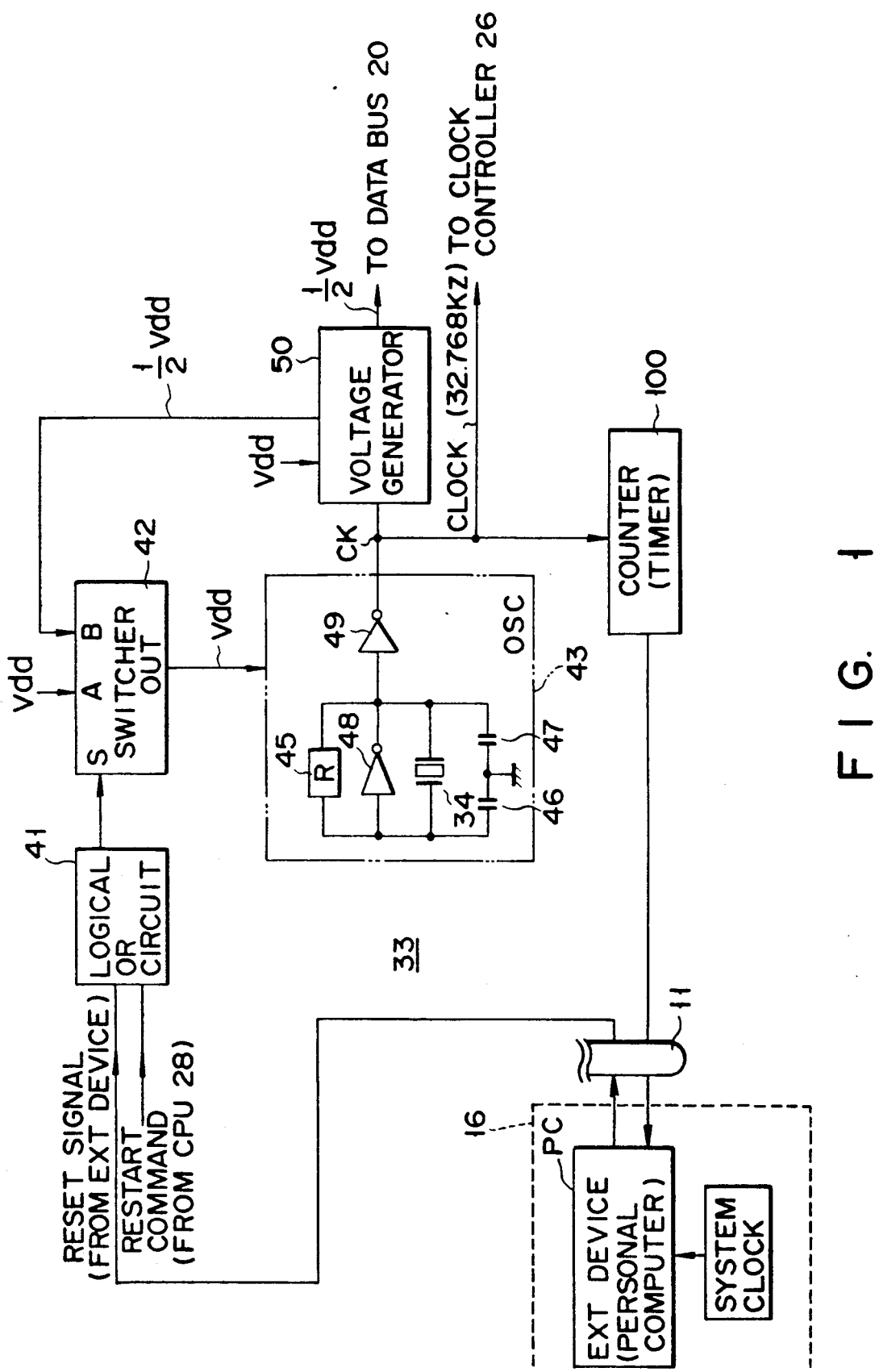
F I G. 1

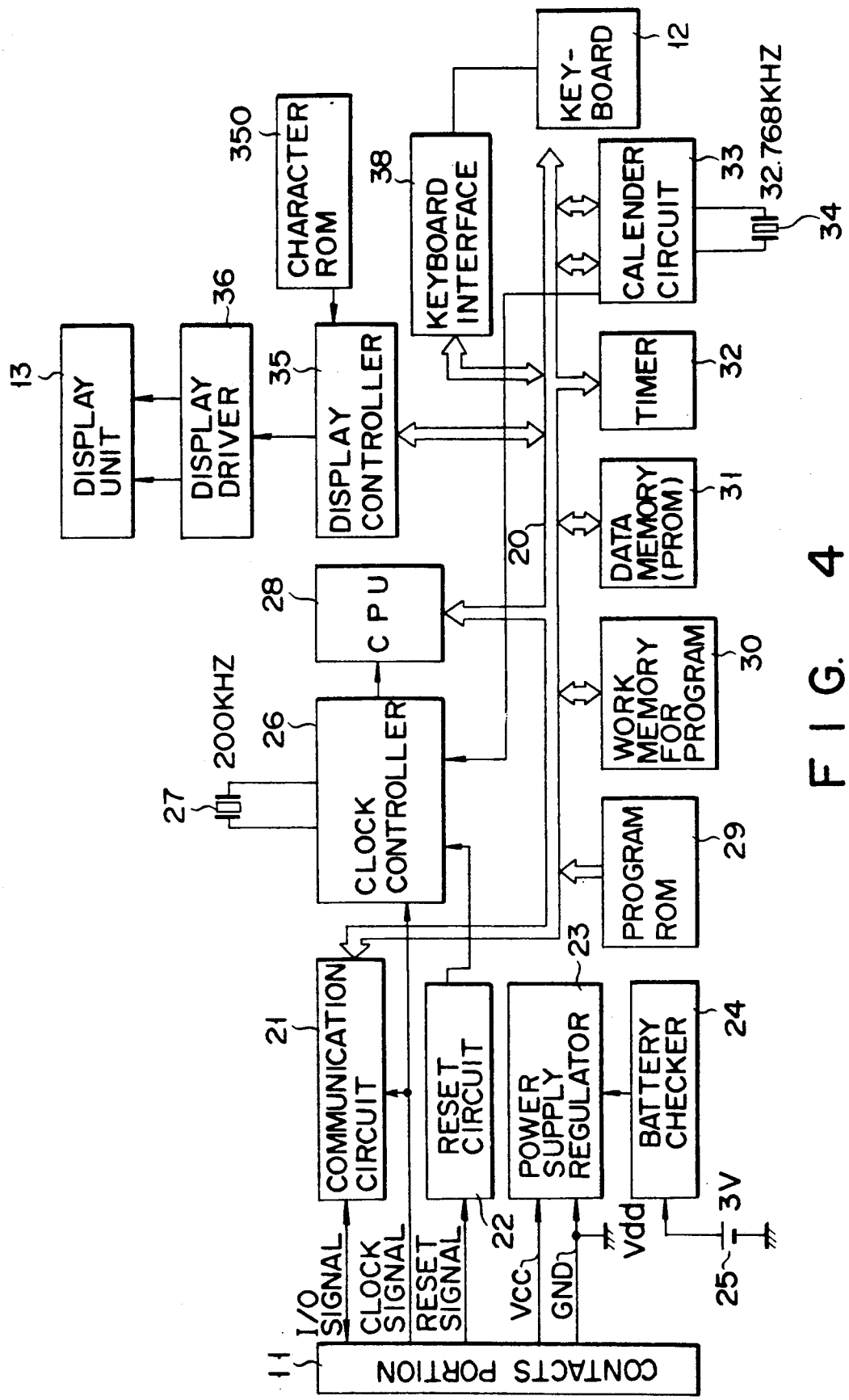
F I G. 4

POWER SUPPLY RELIABILITY OF PORTABLE ELECTRONIC DEVICE

BACKGROUND OF THE INVENTION

1. Field of the Invention

The present invention relates to a portable electronic device such as a multifunctional IC card which incorporates, e.g., a CPU, a data memory, a built-in battery, and the like, and is solely used to provide an electronic calculator function, a time display function, or the like, or is inserted in a terminal in use.

2. Description of the Related Art

Conventionally, multifunctional IC cards have been developed. An IC card of this type incorporates a CPU (control element), a data memory, and the like, has a keyboard, a display unit, and the like, and is solely used to provide an electronic calculator function, a time display function, or the like, or is inserted in a terminal in use.

An IC card of this type has an oscillator for always outputting a stable clock signal.

When a voltage from a built-in battery is directly supplied to the oscillator, current consumption of the oscillator is large, and a service life of the built-in battery is shortened.

When a power supply voltage having a low voltage value ($\frac{1}{2}$ voltage) is generated based on an output from the internal oscillator using a voltage generator, and this low voltage is supplied to the internal oscillator, current consumption can be suppressed, and the service life of the built-in battery can be prolonged.

In this arrangement, however, when an IC card is accidentally dropped, or some shock acts on the IC card, a vibrator of the oscillator may be brought into contact with a case of the IC card, and its vibration may be stopped. In this case, the function of the voltage generator is stopped, and supply of a power supply voltage is stopped. As a result, the function of the IC card is stopped.

SUMMARY OF THE INVENTION

It is an object of the present invention to provide a portable electronic device which can eliminate the conventional drawback that when oscillation of a power supply oscillator is stopped, the oscillator cannot be restarted, and the function of an IC card is stopped, and which employs a circuit with small current consumption, and when oscillation of an oscillator is stopped due to some shock, can restart the oscillator to prevent stop of a function.

A portable electronic device of the present invention comprises a control element, and performs an operation using a built-in battery. This device is constituted by a clock generation unit for generating a clock signal, a voltage generation unit for generating a power supply voltage lower than a power supply voltage of the battery on the basis of the clock signal from the clock generation unit, an instruction unit for instructing restart of the clock generation unit, and a supply unit for, when the restart instruction is issued from the instruction unit, supplying the power supply voltage from the battery to the clock generation unit, and after the clock generation unit is restarted, supplying the power supply voltage from the voltage generation unit to the clock generation unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 are views for explaining an embodiment of the present invention, in which;

FIG. 1 is a block diagram showing an arrangement of main part of a calender circuit;

FIG. 2 is a plan view showing a structure of an IC card;

FIG. 3 is a perspective view showing a terminal for the IC card;

FIG. 4 is a block diagram showing a schematic arrangement of an electrical circuit of the IC card, and FIG. 5 is a flow chart for explaining a restart operation of an oscillator;

DETAILED DESCRIPTION OF THE PREFERRED EMBODIMENTS

An embodiment of the present invention will be described below with reference to the accompanying drawings.

Figure 2:
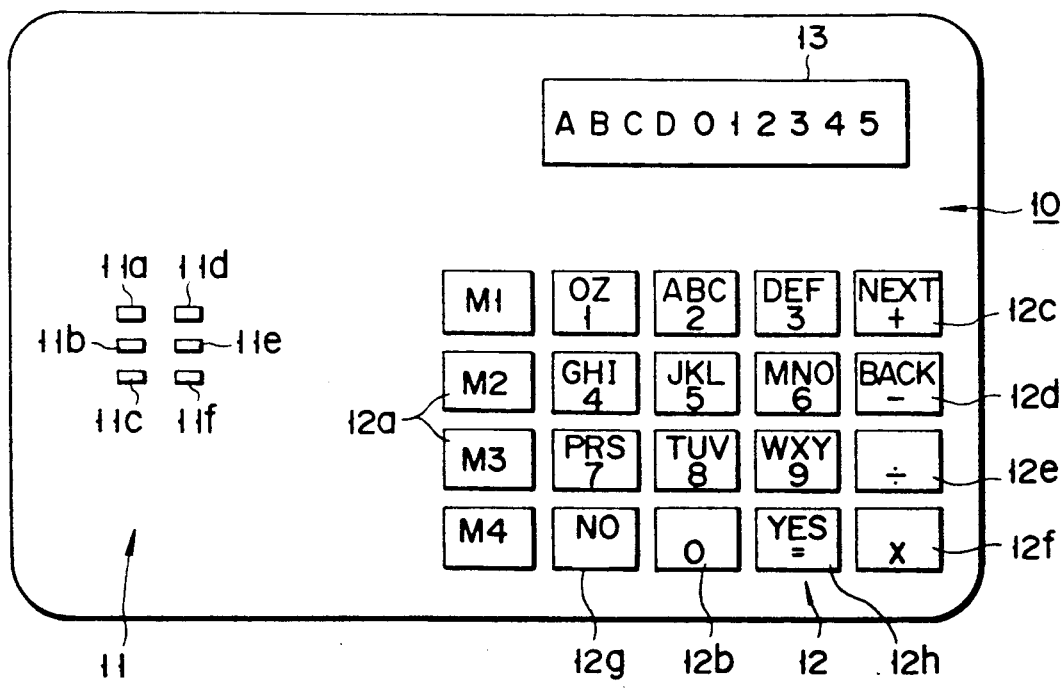

In FIG. 2, reference numeral 10 denotes an IC card as a portable electronic device, which is a multifunctional IC card having various functions. For example, IC card 10 has an on-line function used with a terminal (to be described later), an off-line function in which IC card 10 is solely operated, and a standby state wherein only a timepiece function is enabled.

The off-line function includes an electronic calculator mode in which the card can be used as an electronic calculator, a clock mode for displaying a time based on a timepiece used by a user, an electronic note (memorandum) mode in which addresses, names, telephone numbers, and the like are registered or read out, and a purchase mode in which IC card 10 is utilized as a plurality of kinds of credit cards. Thus, IC card 10 can be solely used in the mode of this function.

In the purchase mode, IC card 10 stores a balance, a valid date, purchase records, and the like. Upon every purchase, a purchase amount is subtracted from the balance stored in IC card 10 and purchase information is recorded. When the balance in IC card 10 becomes zero or the valid date expires, a secret code is issued from a contract bank, thus updating the contents of the IC card.

Contacts portion 11 arranged at a position complying with the standards of a card, keyboard 12 including 20 keys, and display unit 13 arranged on a surface portion above keyboard 12 and formed of a liquid crystal element are arranged on the surface of IC card 10.

Contacts portion 11 includes a plurality of terminals 11a to 11f, i.e., operation power supply voltage (Vcc, +5V), EEPROM write power supply voltage, ground, clock signal, reset signal, and data I/O terminals.

Keyboard 12 includes selection keys (M1, M2, M3, and M4) 12a for selecting kinds of card, i.e., processing operations corresponding to various credit cards, cash cards, and the like, ten-key pad 12b, four-arithmetic rule keys as function keys, that is, addition (+) key 12c, subtraction (−) key 12d, division (÷) key 12e, multiplication (×) key 12f, decimal point (.) key 12g, and equal (=) key 12h.

Addition key 12c is used as a NEXT key, i.e., a mode selection key for selecting a mode during a display of a date and time in the off-line mode. Subtraction key 12d is used as a BACK key, i.e., a key for returning a display state of display unit 13 to a previous state. Multiplication key 12f is used as a start key. Decimal point key 12g is used as a NO key and an end key. Equal key 12h is used as a YES key and a power-on key.

When equal key 12h as the power-on key is depressed, a CPU (to be described later) is released from a HALT state, and causes display unit 13 to display time and date as an operation start message.

In this state, when keys of ten-key pad 12b are depressed, IC card 10 is set in the electronic calculator mode, and four arithmetic operations can be performed.

Addition key 12c as the mode selection key is used as a key for advancing the display state o display unit 13 which is displaying date and time to another mode. Every time addition key 12c is depressed, the electronic memorandum, time set, date set, purchase transaction modes, and the like are displayed on display unit 13 as a menu. When these modes are executed, equal key 12h as the YES key is depressed. Then, the control enters the corresponding mode, and the selected mode can be executed.

Display unit 13 is a 16-digit display, each digit of which has a 5×7 dot matrix.

Figure 3:
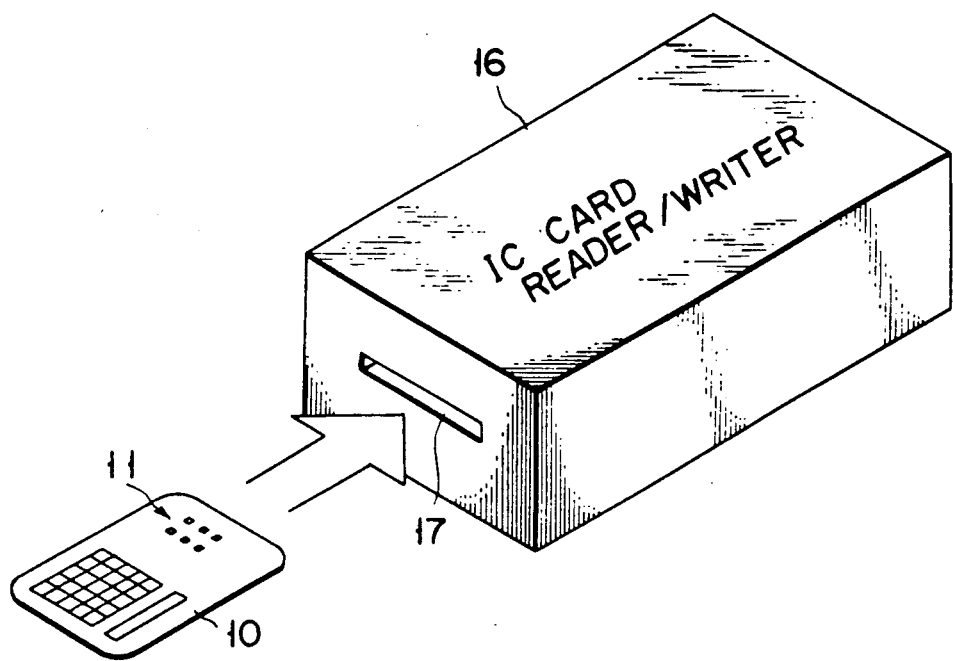

FIG. 3 shows an outer appearance of IC card reader/writer 16 used in a terminal for an issuer dealing with IC card 10, e.g., a personal computer. More specifically, reader/writer 16 is electrically connected to contacts portion 11 of IC card 10 inserted from card slot 17, and reads or writes data from or in a memory of IC card 10.

IC card reader/writer 16 is connected to a main body (FIG. 1) of personal computer PC through a cable.

An electrical circuit of IC card 10 is arranged, as shown in FIG. 4. More specifically, the electrical circuit comprises contacts portion 11; communication circuit 21; reset circuit 22; power supply regulator 23; internal battery (built-in battery) 25 of, e.g., 3V; battery checker 24 for checking if a voltage value of built-in battery 25 is equal to or higher than a rated value; clock controller 26; oscillator 27, as an arithmetic clock quartz oscillator, for outputting a signal at an oscillation frequency of 200 kHz (high-speed clock); control CPU (central processing unit) 28; program ROM 29 for storing a control program; work memory 30 for a program; data memory 31, comprising a PROM, for storing an ID number, data, and the like; timer 32 used for measuring time during a processing operation; calender circuit 33; oscillator (clock generation means) 34, as a fundamental clock quartz oscillator, for outputting a signal at an oscillation frequency of 32.768 kHz (low-speed clock); display controller 35; display driver 36 for driving display unit 13; and keyboard interface 38 as a key input circuit for keyboard 12.

Communication circuit 21, CPU 28, ROM 29, work memory 30, data memory 31, timer 32, calender circuit 33, display controller 35, and keyboard interface 38 are connected to each other through data bus 20.

In a reception mode, communication circuit 21 converts serial I/O signals supplied from terminal 16 through contacts portion 11 into parallel data, and outputs it onto data bus 20. In a transmission mode, circuit 21 converts parallel data supplied from data bus 20 into serial I/O signals, and outputs them to terminal 16 through contacts portion 11. In this case, the format content of conversion is determined by terminal 16 and IC card 10.

Reset circuit 22 generates a reset signal to start CPU 28 when the on-line mode is set.

Power supply regulator 23 switches a drive mode from one by built-in battery 25 to the other by an external power supply after the lapse of a predetermined period of time from the beginning of the on-line mode. When the off-line mode is set, i.e., an external voltage is decreased, regulator 23 switches the drive mode from one by the external power supply to the other by built-in battery 25.

Clock controller 26 appropriately switches the low- and high-speed clocks in the off-line mode in which a card operation is performed by built-in battery 25. For the purpose of power saving, after execution of a HALT command, controller 26 stops oscillator 27 which outputs a signal of an oscillation frequency of 200 kHz (high-speed clock), thereby stopping supply of a clock signal to CPU 28. Then, controller 26 waits in a perfect HALT state. Clock controller 26 basically selects a timepiece clock (32.768 kHz) upon execution of the HALT command.

Calender circuit 33 has a timepiece (timer 32) which can be desirably set and updated by a card holder, and a transaction timepiece (counter 100) in which a world standard time is set upon issuance of the card and cannot be changed.

Display controller 35 converts display data supplied from CPU 28 into a character pattern using character generator 350 comprising an internal ROM, and displays the character pattern on display unit 13 using display driver 36.

Keyboard interface 38 converts an input at keyboard 12 into a corresponding key input signal, and outputs it to CPU 28.

The main part of calender circuit 33 will be described in detail below with reference to FIG. 1. More specifically, an oscillation start reset signal supplied from an external device (e.g., a pulse generator; not shown) in the manufacture of card 10, or a restart command output from CPU 28 is supplied to select input S of drive power supply switcher (supply means) 42 through logical OR circuit 41. Switcher 42 is supplied with power supply voltage Vdd from built-in battery 25, and power supply voltage Vdd/2 from voltage generator 50 (to be described later).

When drive power supply switcher 42 receives the reset signal or the restart command, it outputs power supply voltage Vdd from built-in battery 25; when it receives neither of these signals, it outputs power supply voltage Vdd/2 from voltage generator 50. The reset signal or the restart command is supplied for, e.g., 1 sec until a circuit operation of card 10 is stabilized after card 10 is started.

The output from switcher 42 is supplied to oscillation circuit 43.

Oscillation circuit 43 oscillates a clock signal of 32.768 kHz in accordance with power supply voltage Vdd or Vdd/2 selectively supplied from switcher 42. Oscillation circuit 43 comprises oscillator 34 having an oscillation frequency of 32.768 kHz, resistor 45 capacitors 46 and 47, and inverters 48 and 49. Clock signal CK generated by oscillation circuit 43 is supplied to voltage generator 50, and is also supplied to counter 100 and clock controller 26.

Figure 1A:
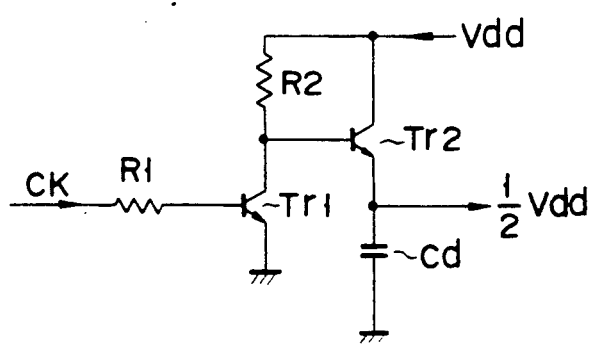
FIG. 1A is a detailed circuit diagram of a voltage generator shown in FIG. 1.

Voltage generator 50 is a circuit for generating voltage Vdd/2 half the power supply voltage of built-in battery 25 in accordance with clock signal CK from oscillation circuit 43, and has an arrangement, as shown in, e.g., FIG. 1A. More specifically, NPN bipolar transistor (switching element) Tr1 is enabled/disabled in response to clock signal CK having a duty cycle of 50% which is input to its base through resistor R1. The emitter of transistor Tr1 is grounded, and its collector is connected to power supply Vdd through resistor R2 and to the base of NPN transistor Tr2. The collector of transistor Tr2 is applied with power supply voltage Vdd, and its emitter is grounded through capacitor Cd.

Capacitor Cd is charged by an emitter current of ON transistor Tr2 for half a period of clock signal CK in which transistor Tr1 is kept OFF. Capacitor Cd is discharged through a load powered by a charge accumulated in capacitor Cd for the other half period of clock CK. Capacitor Cd repeats charging and discharging every half periods of clock signal CK, so that a voltage of an average of almost Vdd/2 appears across capacitor Cd.

Power supply voltage Vdd/2 output from voltage generator 50 is supplied to drive power supply switcher 42, and also to data bus 20.

The operation of the above arrangement will be described below. Assuming that IC card 10 is dropped from a position at a considerable height, a strong shock acts on this card, and oscillation of oscillation circuit 43 is stopped, a card holder brings this card to an issuer as a card suffering from a trouble. The issuer inserts IC card 10 in slot 17 of terminal 16. IC card 10 is then accepted, and contacts portion 11 of IC card 10 is electrically connected to a connection portion in terminal 16. Thus, external power supply voltage Vcc, a clock signal, and a reset signal are supplied to IC card 10 through contacts portion 11. Power supply regulator 23 shown in FIG. 4 checks the level of power supply voltage Vcc, and switches the drive mode by built-in battery 25 to one by external power supply voltage Vcc. In response to the external reset signal, reset circuit 22 generates an internal reset signal to start CPU 28. In this case, CPU 28 uses the clock signal (external clock) from terminal 16 as a drive clock.

When the reset state is canceled, CPU 28 executes the content of program ROM 29 from its address "0" in response to the external clock. When the program starts from address "0", CPU 28 in IC card 10 checks the state of external voltage Vcc. If CPU 28 determines that external voltage Vcc has a sufficient level, and a power-down mode for detecting a decrease in external voltage is not set, it executes an on-line mode program.

In the on-line mode, a data communication format prepared in IC card 10 is sent to terminal 16 first, and an instruction from terminal 16 is then waited.

When terminal 16 normally receives communication mode data, it outputs the restart command to calender circuit 33 in IC card 10. Thus, calender circuit 33 restarts oscillation of oscillation circuit 43 in accordance with the restart command.

More specifically, the restart command is supplied to select input S of drive power supply switcher 42 through OR circuit 41. Drive power supply switcher 42 selects power supply voltage Vdd from built-in battery 25 and outputs it to oscillation circuit 43 while the restart command is supplied. Oscillation circuit 43 oscillates a clock signal of 32.768 kHz in accordance with power supply voltage Vdd applied from drive power supply switcher 42.

The clock signal from oscillation circuit 43 is supplied to voltage generator 50. Voltage generator 5 outputs power supply voltage Vdd/2 to switcher 42 in accordance with the input clock signal.

When supply of the restart command to switched 42 is stopped, switcher 42 selects power supply voltage Vdd/2 from voltage generator 50, and outputs it to oscillation circuit 43. Oscillation circuit 43 then oscillates a clock signal of 32.768 kHz in accordance with power supply voltage Vdd/2 applied from drive power supply switcher 42.

Thereafter, normal on-line processing is executed.

Figure 5:
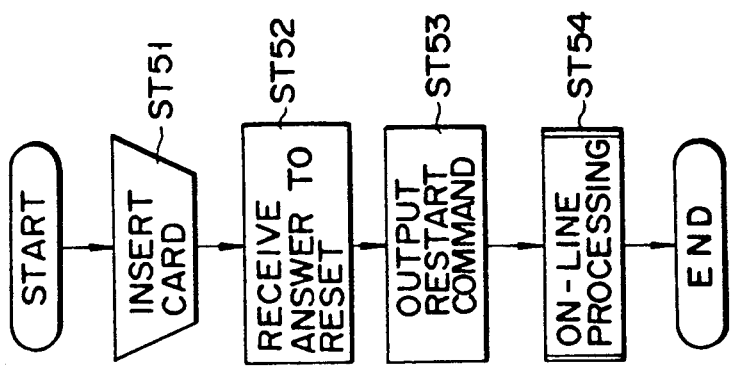

Note that a flow for explaining the operation described above is as shown in FIG. 5.

When IC card 10 is inserted in terminal 16 shown in FIG. 3 (ST51), a signal (answer-to-list) is sent from terminal 16 to card 10 through communication circuit 21 shown in FIG. 4 (ST52). Upon reception of this signal, CPU 28 in card 10 outputs the restart command (ST53). Power supply switcher 42 shown in FIG. 1 then switches an operation voltage of card 10 from Vdd/2 for a power save mode to Vdd for a normal operation mode. In the normal operation mode, card 10 performs on-line processing with a host computer or the like (not shown) through terminal 16 (ST54).

Therefore, in the restart mode, power supply voltage Vdd from built-in battery 25 is applied to oscillation circuit 43, and thereafter, power supply voltage Vdd/2 generated by voltage generator 50 in response to the clock signal from oscillation circuit 43 is applied to oscillation circuit 43. Therefore, the battery power supply of built-in battery 25 is directly used upon starting. After the circuit starts, a power-save operation can be performed by a value ½ the battery power supply of built-in battery 25.

The case has been described wherein when terminal 16 normally receives communication mode data, the restart command is forcibly sent to IC card 10. However, the present invention is not limited to this. When time of a timepiece (counter 100 or timer 32) in IC card 10 is not correct, or when the power supply voltage from voltage generator 50 is not Vdd/2 (e.g., about Vdd/3), the restart command may be sent to IC card 10.

More specifically, when terminal 16 normally receives communication mode data, it outputs an output request of a power supply voltage from voltage generator 50 to CPU 28 in IC card 10. Then, CPU 28 transmits the power supply voltage from voltage generator 50 in calender circuit 33 to terminal 16 through data bus 20, communication circuit 21, and contacts portion 11.

When the power supply voltage from voltage generator 50 is kept OFF, terminal 16 outputs the restart command to calender circuit 33 in IC card 10. Then, calender circuit 33 restarts oscillation of oscillation circuit 43 in accordance with the restart command, as described above.

When the power supply voltage from voltage generator 50 is not OFF, terminal 16 outputs a time read request to CPU 28 in IC card 10. In this case, CPU 28 transmits time in calender circuit 33 to terminal 16 through data bus 20, communication circuit 21, and contacts portion 11.

When the input time is considerably different from actual time by, e.g., several hours, terminal 16 outputs the restart command to calender circuit 33 in IC card 10. Calender circuit 33 restarts oscillation of oscillation circuit 43 in accordance with the restart command, as described above.

Figure 6:
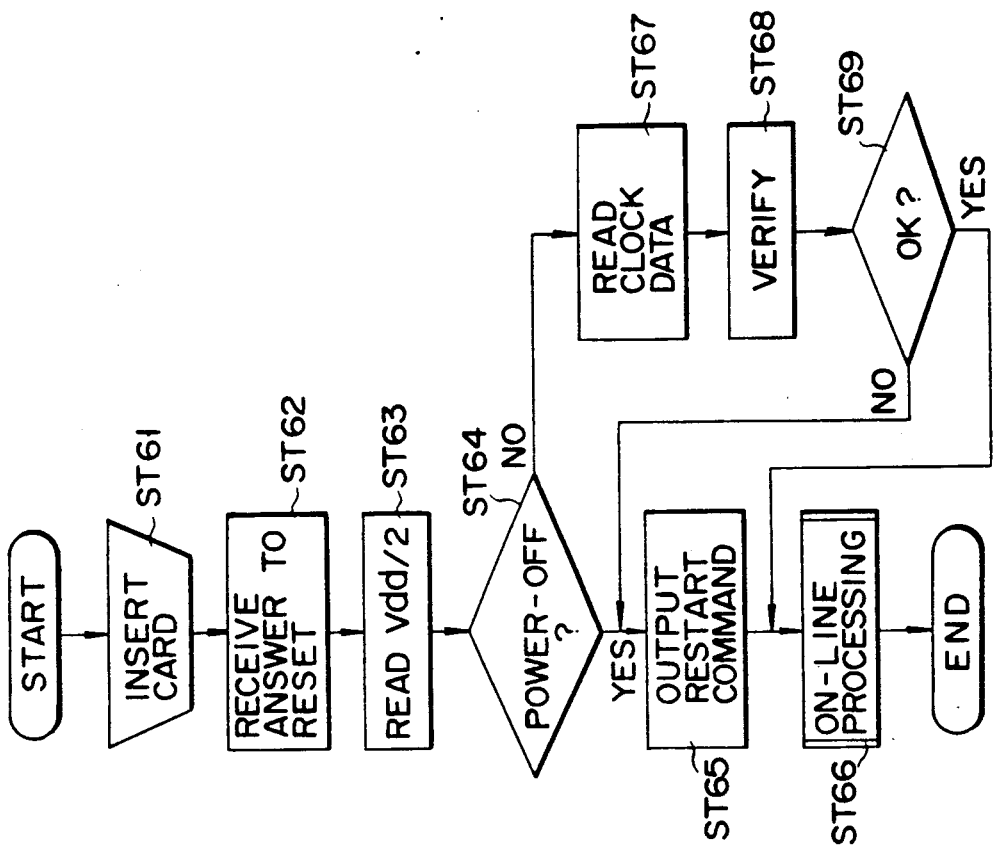
FIG. 6 is a flow chart for explaining a restart operation of an oscillator according to another embodiment of the present invention.

Note that a flow chart for explaining the operation described above is as shown in FIG. 6.

When IC card 10 is inserted in terminal 16 shown in FIG. 3 (ST61), a signal (answer-to-list) is sent from terminal 16 to card 10 through communication circuit 21 shown in FIG. 4 (ST62). Upon reception of this signal, inverter 61 and flip-flop 62 (FIG. 7) in card 10 read a logic value of Vdd/2 based on the presence/absence of a voltage from a Vdd/2 circuit (ST63). When a rated value of Vdd/2 is 1.5V, a voltage of 1.0V or more is read as logic "1", and a voltage of less than 1.0V is read as logic "0".

Figure 7:
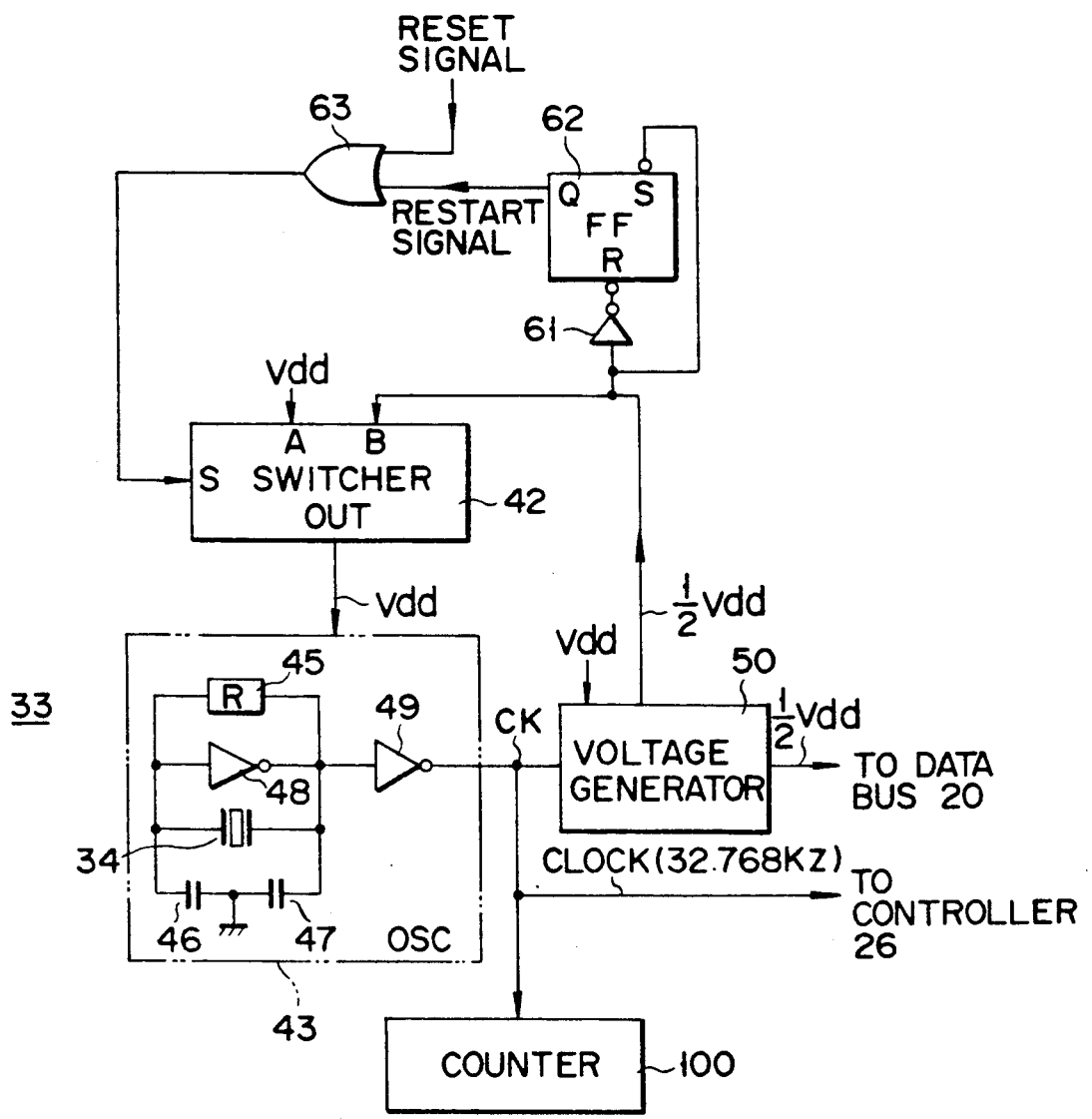
FIG. 7 is a block diagram showing an arrangement of main part of a calender circuit according to the embodiment shown in FIG. 6.

If no voltage is output from the Vdd/2 circuit, i.e., a power-OFF state (Vdd/2 read signal="0") is detected (YES in ST64), the restart command is output from flip-flop 62 in FIG. 7 (ST65), and on-line processing is then executed (ST66).

If a voltage is output from the Vdd/2 circuit, i.e., a power-ON state (Vdd/2 read signal="1") is detected (NO in ST64), CPU 28 reads clock data from timer 32 shown in FIG. 4 (ST67). The clock data is verified using reference clock data (output from counter 100 shown in FIG. 1) (ST68). When he clock data read out from timer 32 in card 10 deviates from the reference clock data by a predetermined value (e.g., 1 min) or more (NO in ST69), the restart command is output (ST65), and on-line processing is then executed (ST66). When a difference between the clock data read out from timer 32 in card 10 and the reference clock data falls within the predetermined value (YES in ST69), on-line processing is immediately started (ST66).

As described above, when the oscillator of the IC card is stopped by a shock when the card is dropped, the oscillator is restarted by the restart command from the terminal, and the function of the IC card is resumed.

In the above embodiment, the case has been described wherein when the oscillator of the IC card is stopped by a shock when the card is dropped, the terminal of an issuer issues the restart command. However, the present invention is not limited to this. When the oscillator of the IC card is stopped by a shock when the card is dropped, the restart operation can be performed by the IC card itself.

In this case, the main part of calender circuit 33 is arranged as shown in FIG. 7. The same reference numerals in FIG. 7 denote the same parts as in FIG. 1, and a detailed description thereof will be omitted. More specifically, a power supply voltage output from voltage generator 50 to drive power supply switcher 42 is supplied to the set input terminal of flip-flop 62, and is also input to the reset input terminal thereof through inverter 61. The set output of this flip-flop 62 is supplied to select input S of switcher 42. OR circuit 63 receives an oscillation start reset signal supplied from an external device (e.g., PC in FIG. 1) upon manufacture of IC card 10.

According to this arrangement, when oscillation is stopped by a shock when IC card 10 is dropped from a position at a considerable height, the power supply voltage from voltage generator 50 is turned off to "0", and flip-flop 62 is set. Set output Q (restart signal) of flip-flop 62 is supplied to select input S of switcher 42 as a restart signal through OR circuit 63.

While the restart signal is supplied, switcher 42 outputs power supply voltage Vdd from built-in battery 25 to oscillation circuit 43. Thus, oscillation circuit 43 oscillates a clock signal of 32.768 kHz in accordance with power supply voltage Vdd applied from switcher 42. The clock signal from oscillation circuit 43 is supplied to voltage generator 50. Voltage generator 50 outputs power supply voltage Vdd/2 to switcher 42 in accordance with the input clock signal.

When supply of the restart signal to switcher 42 is stopped, switcher 42 selects power supply voltage Vdd/2 from voltage generator 50, and outputs it to oscillation circuit 43. Oscillation circuit 43 then oscillates a clock signal of 32.768 kHz in accordance with power supply voltage Vdd/2 applied from drive power supply switcher 42.

In the above embodiment, an IC card is used. However, the present invention is not limited to this. A portable electronic device need not have a card-like shape but may have other shapes, e.g., a rod-like shape as long as it has a data memory and a control element, and can selectively perform I/Os from an external device.

As described above, according to the present invention, there can be provided a portable electronic device which can restart an oscillator using a circuit with small current consumption when oscillation of the oscillator is stopped by some shock, and can prevent stop of the device function.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable electronic device comprising:
   means for generating a clock signal;
   means for supplying a first voltage to the clock signal generating means;
   means for generating a second voltage lower than the first voltage according to the clock signal generated by the clock signal generating means;
   means for detecting the generation of the second voltage generated by the second voltage generating means and outputting a status signal when said detection means detects the generation of the second voltage; and
   means for switching a voltage supply of said clock signal generating means from said first voltage to the second voltage in response to said status signal.

2. A device according to claim 1, further comprising:
   means for counting the clock signal to provide clock data;
   means for providing reference time data and a predetermined value; and
   means for comparing the clock data with the reference time data to generate a reset signal when a difference between the two data exceeds said predetermined value,
wherein said switching means includes means for instructing supply of the first voltage to said clock signal generating means in response to the reset signal.

3. A device according to claim 1, wherein said device is built in an IC card.

4. A device according to claim 1, further comprising:
a logic circuit element operated in response to the clock signal and
means for stopping, after execution of a halt command, supply of the clock signal to said logic circuit element when said clock generating means is powered by said first voltage, thereby causing power saving.

5. A device according to claim 1, further comprising:
means for providing a high-speed clock signal having a higher frequency higher than that of the clock signal; and
a logic circuit element which is operated in response to one of the clock signal and said high-speed clock signal.

6. A portable electronic device operated with a built-in battery which generates a first voltage, comprising:
means for generating a clock signal;
means for generating a second voltage lower than the first voltage of said battery in response to the clock signal from said clock signal generating means;
means for instructing start of said clock signal generating means by outputting a start instruction; and
means for supplying the first voltage to said clock signal generating means in response to said start instruction generated by said instructing means and supplying the second voltage to said clock signal generating means after said clock signal generating means has started generating said clock signal.

7. A portable electronic device operated with a built-in battery which generates a first voltage, comprising:
means for generating a clock signal;
means for generating a second voltage lower than the first voltage of said battery in response to the clock signal from said clock signal generating means;
means for detecting the generation of the second voltage from said voltage generation means and outputting a restart signal when said generation of the second voltage is not detected; and
supply means for supplying the first voltage to said clock signal generating means in response to said restart signal and supplying the second voltage to said clock signal generating means when said detection means detects generation of the second voltage.

8. A portable electronic device operated with a built-in battery which generates a first voltage, comprising:
means for generating a clock signal;
means for measuring time on the basis of the clock signal from said clock signal generating means;
means for generating a second voltage lower than the first voltage of said battery in response to the clock signal from said clock signal generating means;
instruction means for outputting a start instruction to start generation of said clock signal by said clock signal generating means;
means for detecting, in response to said start instruction, whether or not said measuring means exceeds a predetermined variance in accordance with a standard clock signal and outputting a status signal in accordance therewith; and
supply means for supplying, in response to said status signal, the first voltage to said clock signal generating means when said detecting means detects that said measuring means exceeds said variance, and supplying the second voltage to said clock signal generating means when said detection means determines said measuring means operates within said variance.

* * * * *